(12) United States Patent
Endo

(10) Patent No.: US 11,044,379 B2
(45) Date of Patent: Jun. 22, 2021

(54) IMAGE PROCESSING APPARATUS AND DISPLAY METHOD

(71) Applicant: TOSHIBA TEC KABUSHIKI KAISHA, Tokyo (JP)

(72) Inventor: Hideki Endo, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/585,546

(22) Filed: Sep. 27, 2019

(65) Prior Publication Data

US 2021/0099605 A1  Apr. 1, 2021

(51) Int. Cl.
  *H04N 1/32* (2006.01)
  *H04N 1/00* (2006.01)
  *G06F 16/248* (2019.01)
  *G06F 16/2457* (2019.01)

(52) U.S. Cl.
  CPC ....... *H04N 1/32106* (2013.01); *G06F 16/248* (2019.01); *G06F 16/24578* (2019.01); *H04N 1/00408* (2013.01); *H04N 1/32085* (2013.01)

(58) Field of Classification Search
  CPC .......... H04N 1/32106; H04N 1/32085; H04N 1/00408; G06F 16/24578; G06F 16/248
  See application file for complete search history.

(56) References Cited

U.S. PATENT DOCUMENTS

| 8,553,261 B2 | 10/2013 | Okada | |
| 9,288,348 B2 * | 3/2016 | Maekawa | H04N 1/4413 |
| 2008/0256355 A1 | 10/2008 | Takemoto | |
| 2009/0122342 A1 * | 5/2009 | Kawano | H04N 1/00474 358/1.15 |

* cited by examiner

*Primary Examiner* — Neil R McLean
(74) *Attorney, Agent, or Firm* — Kim & Stewart LLP

(57) ABSTRACT

An image processing apparatus includes a storage device in which a FAX transmission history including a plurality of FAX transmission records is stored, a processor, and a display device. The processor is configured to search the FAX transmission history in response to a search instruction to retrieve FAX transmission records according to a search term specified in the search instruction, and determine a display order of FAX transmission destinations specified in the retrieved FAX transmission records based on a predetermined FAX transmission condition for each of the retrieved FAX transmission records. The display device is configured to display the FAX transmission destinations according to the display order determined by the processor.

20 Claims, 7 Drawing Sheets

| No | Destination | Transmission date | FAX number | Mail address | FAX type | Transmission time | Result |
|----|-------------|-------------------|------------|--------------|----------|-------------------|--------|
| 1 | Tokyo Taro | 2016/8/1 | 1234567890 | | G3 | 20 seconds | Success |
| 2 | Tokyo Taro | 2016/12/20 | 1234567890 | | G3 | 21 seconds | Success |
| 3 | Tokyo Taro | 2017/2/27 | 1234567890 | | G3 | 20 seconds | Success |
| 4 | Tokyo Taro | 2017/4/4 | 1234567890 | | G3 | 22 seconds | Failure |
| 5 | Tokyo Taro | 2017/7/5 | 3012345678 | hijklm@co.jp | T38G/G3 | 20 seconds | Success |
| 6 | Tokyo Taro | 2017/10/26 | 3012345678 | hijklm@co.jp | T38G/G3 | 21 seconds | Success |
| 7 | Tokyo Taro | 2018/1/10 | 9087654321 | abcde@co.jp | T38 SIP | 7 seconds | Success |
| 8 | Tokyo Taro | 2018/2/5 | 9087654321 | abcde@co.jp | T38 SIP | 7 seconds | Success |
| 9 | Tokyo Taro | 2018/3/25 | 9087654321 | abcde@co.jp | T38 SIP | 6 seconds | Success |
| 10 | Tokyo Taro | 2018/5/10 | 9087654321 | abcde@co.jp | T38 SIP | 6 seconds | Success |

Transmission history
Destination : Tokyo Taro

FIG.4

Transmission history
Destination : Tokyo Taro

| No | Destination | Transmission date | FAX number | Mail address | FAX type | Transmission time | Result |
|---|---|---|---|---|---|---|---|
| 1 | Tokyo Taro | 2016/8/1 | 1234567890 | | G3 | 20 seconds | Success |
| 2 | Tokyo Taro | 2016/12/20 | 1234567890 | | G3 | 21 seconds | Success |
| 3 | Tokyo Taro | 2017/2/27 | 1234567890 | | G3 | 20 seconds | Success |
| 4 | Tokyo Taro | 2017/4/4 | 1234567890 | | G3 | 22 seconds | Failure |
| 5 | Tokyo Taro | 2017/7/5 | 3012345678 | hijklm@co.jp | T38G/G3 | 20 seconds | Success |
| 6 | Tokyo Taro | 2017/10/26 | 3012345678 | hijklm@co.jp | T38G/G3 | 21 seconds | Success |
| 7 | Tokyo Taro | 2018/1/10 | 9087654321 | abcde@co.jp | T38 SIP | 7 seconds | Success |
| 8 | Tokyo Taro | 2018/2/5 | 9087654321 | abcde@co.jp | T38 SIP | 7 seconds | Success |
| 9 | Tokyo Taro | 2018/3/25 | 9087654321 | abcde@co.jp | T38 SIP | 6 seconds | Success |
| 10 | Tokyo Taro | 2018/5/10 | 9087654321 | abcde@co.jp | T38 SIP | 6 seconds | Success |

IMAGE PROCESSING APPARATUS AND DISPLAY METHOD

FIELD

Embodiments described herein relate generally to an image processing apparatus and a display method.

BACKGROUND

A facsimile (FAX) apparatus includes an apparatus storing an address book in which a FAX number that is to be a transmission destination is registered in advance. The user searches the address book when transmitting the FAX. The user transmits the FAX by selecting the transmission destination displayed as the search result. In the address book, a plurality of FAX numbers may be registered for the same transmission destination. When searching such an address book, a plurality of FAX numbers for the same transmission destination may be displayed. In such a situation, there is a problem that it is unclear which FAX number to select when transmitting the FAX.

DESCRIPTION OF THE DRAWINGS

FIG. 4 is a diagram illustrating a specific example of a transmission history of the FAX according to the embodiment.

DETAILED DESCRIPTION

An image processing apparatus according to an embodiment includes a storage device in which a FAX transmission history including a plurality of FAX transmission records is stored, a processor, and a display device. The processor is configured to search the FAX transmission history in response to a search instruction to retrieve FAX transmission records according to a search term specified in the search instruction, and determine a display order of FAX transmission destinations specified in the retrieved FAX transmission records based on a predetermined FAX transmission condition for each of the retrieved FAX transmission records. The display device is configured to display the FAX transmission destinations according to the display order determined by the processor.

Figure 1:
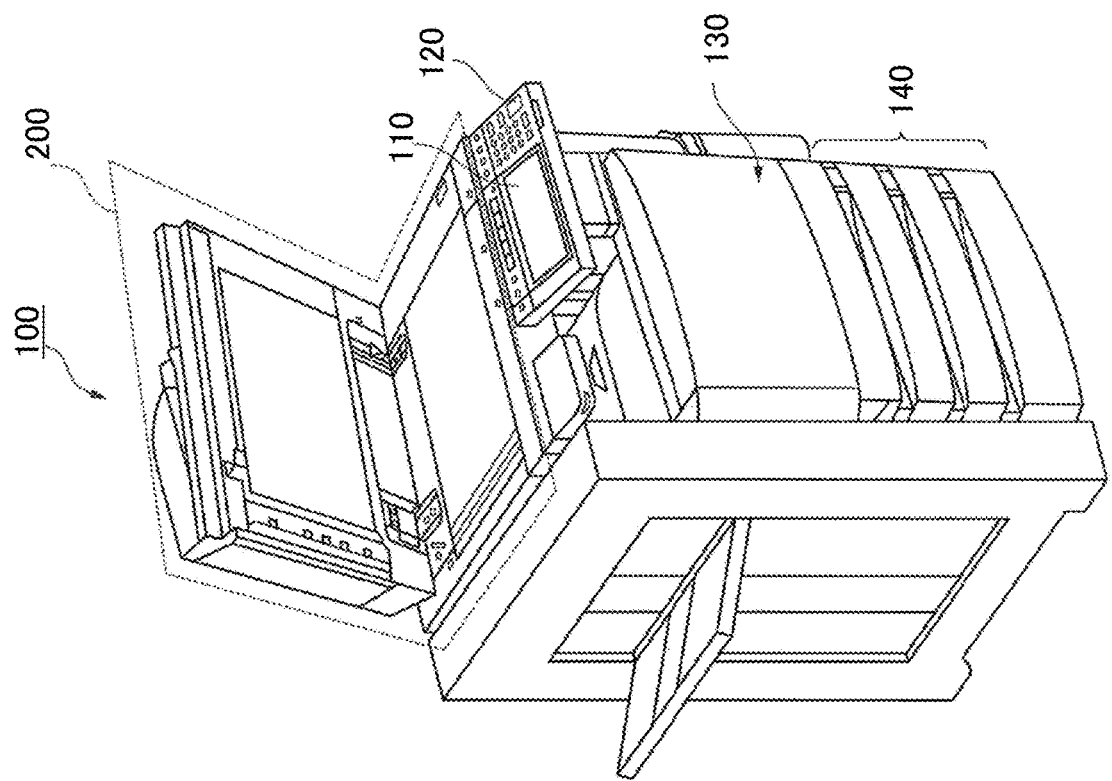
FIG. 1 is an external view showing an example of an overall configuration of an image processing apparatus according to an embodiment.

FIG. 1 is an external view showing an example of the overall configuration of the image processing apparatus 100 according to the embodiment. The image processing apparatus 100 is, for example, an image forming apparatus such as a multifunction peripheral. The image processing apparatus 100 includes a display 110, a control panel 120, a printer unit 130, a sheet storage unit 140, and an image reading unit 200. The printer unit 130 of the image processing apparatus 100 may be an apparatus for fixing a toner image or an ink jet apparatus.

The image processing apparatus 100 reads the image appearing on the sheet to generate digital data, and generates an image file. The sheet is, for example, a document, a paper in which characters or images are depicted, or the like. The sheet may be any object as long as it can be read by the image processing apparatus 100.

The display 110 is an image display device such as a liquid crystal display, an organic EL (Electro Luminescence) display, or the like. The display 110 displays various pieces of information related to the image processing apparatus 100. The display 110 is an example of a display unit.

The control panel 120 includes a plurality of buttons. The control panel 120 accepts the operation of the user. The control panel 120 outputs a signal corresponding to the operation performed by the user to the control unit of the image processing apparatus 100. The display 110 and the control panel 120 may be configured as a single touch panel.

The printer unit 130 forms an image on a sheet based on image information generated by the image reading unit 200 or image information received via the communication path. The printer unit 130 forms an image by, for example, the following process. The image forming unit of the printer unit 130 forms an electrostatic latent image on the photosensitive drum based on the image information. The image forming unit of the printer unit 130 forms a visible image by applying a developer to an electrostatic latent image. A specific example of the developer is a toner. The transfer portion of the printer unit 130 transfers the visible image onto the sheet. The fixing unit of the printer unit 130 fixes the visible image on the sheet by heating and pressing the sheet. The sheet on which the image is formed may be a sheet accommodated in the sheet storage unit 140, or may be a manually inserted sheet.

The sheet storage unit 140 accommodates a sheet used for image formation in the printer unit 130.

The image reading unit 200 generates the image information according to the lightness and darkness of light reflected from an image being read. The image reading unit 200 records the image information that has been generated. The recorded image information may be transmitted to another information processing apparatus via the network. The recorded image information may be used in forming an image on the sheet by the printer unit 130.

Figure 2:
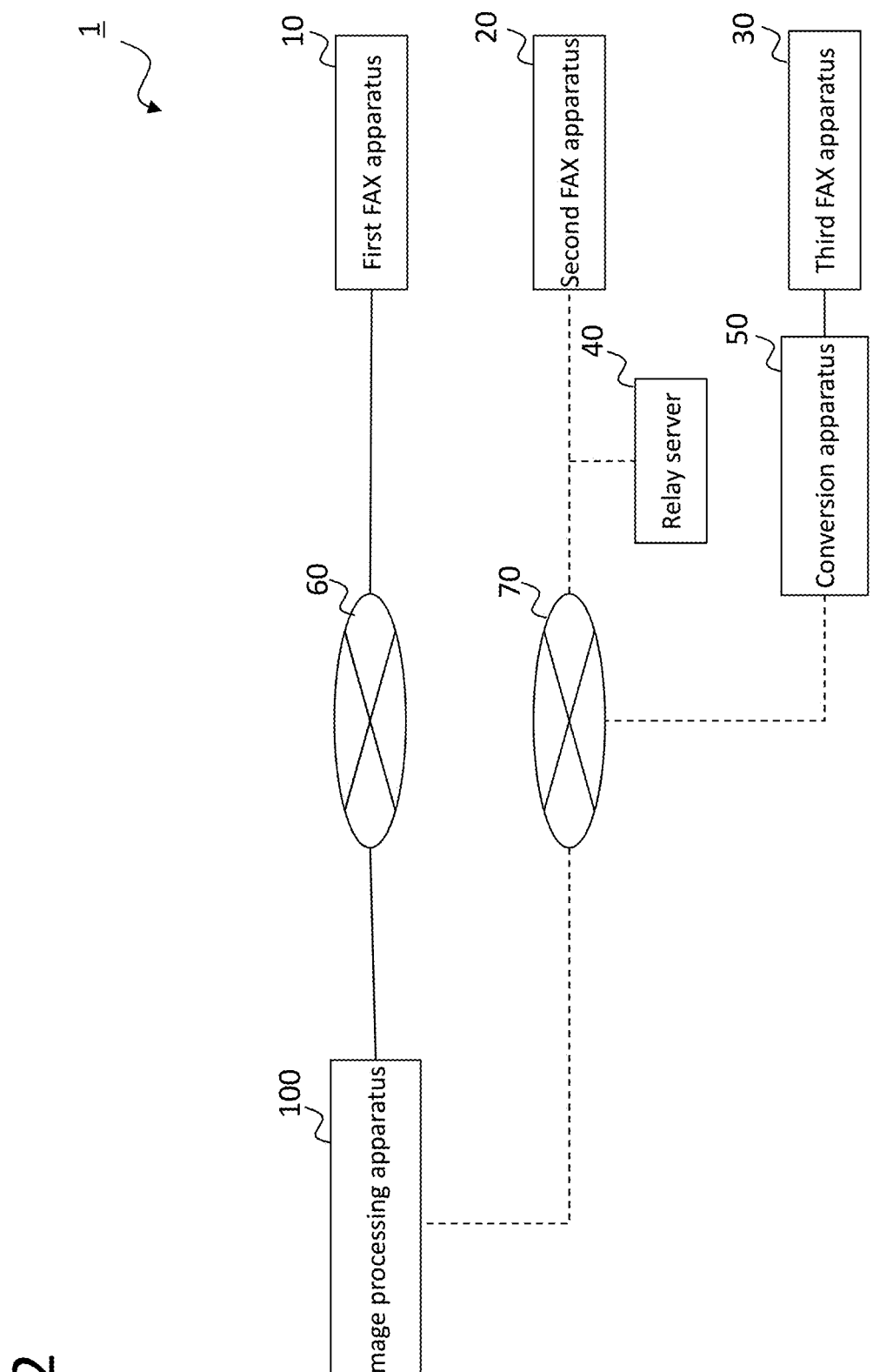
FIG. 2 is a system configuration diagram illustrating a specific example of a system configuration of a FAX transmission system according to an embodiment.

FIG. 2 is a system configuration diagram showing a specific example of the system configuration of the FAX transmission system 1 according to the embodiment. The FAX transmission system 1 includes the image processing apparatus 100, a first FAX apparatus 10, a second FAX apparatus 20, a third FAX apparatus 30, a relay server 40, and a conversion apparatus 50. The image processing apparatus 100 is connected to the first FAX apparatus 10, the second FAX apparatus 20, the third FAX apparatus 30, the relay server 40, and the conversion apparatus 50 for communication via the first network 60 or the second network 70. The first network 60 is, for example, a telephone network such as a PSTN (Public Switched Telephone Network) or an ISDN (Integrated Services Digital Network). The second network 70 is, for example, a TCP/IP protocol network such as the Internet. In FIG. 2, a solid line represents an analog line such as a telephone network or the like. In FIG. 2, a dotted line represents the Internet.

The first FAX apparatus 10 is a standard FAX device capable of transmitting and receiving FAX via a telephone line. The first FAX apparatus 10 receives the FAX transmitted from the image processing apparatus 100 via the first network 60. When the telephone line is an analog line such as PSTN, the first FAX apparatus 10 transmits and receives FAX in accordance with a standard such as G3 FAX or Super G3. The G3 FAX is a FAX standard for transmitting and receiving documents or images using an analog line. The super G3 is a standard in which the transmission and reception of the FAX are made faster than that of the G3 FAX. When the telephone line is a digital line such as ISDN, the first FAX apparatus 10 transmits and receives FAX in accordance with a standard such as G4 FAX. The G4 FAX is a FAX standard for transmitting and receiving documents or images by using a digital line.

The second FAX apparatus 20 is an Internet FAX device capable of transmitting and receiving FAX in accordance with Internet FAX. Internet FAX is a FAX standard by which a FAX is transmitted as an electronic mail (e-mail) with a document or an image attached thereto. The e-mail also contains identification information of the FAX device of the transmission destination. The identification information of the FAX device may be, for example, an e-mail address or a FAX number. The Internet FAX is transmitted to the FAX device of the transmission destination based on the identification information of the FAX device contained in the electronic mail via the relay server 40. In the case of FIG. 2, the FAX device of the transmission destination is the second FAX apparatus 20.

The third FAX apparatus 30 is a standard FAX device capable of transmitting and receiving FAX. The third FAX apparatus 30 receives FAX converted from the Internet FAX to the standard FAX by the conversion apparatus 50. The conversion apparatus 50 transmits the converted FAX to the FAX device of the transmission destination based on the FAX number contained in the electronic mail transmitted as the Internet FAX.

The relay server 40 is an information processing apparatus such as a server. The relay server 40 may be, for example, a Session Initiation Protocol (SIP) server. The relay server 40 relays Internet FAX transmitted to the second FAX apparatus 20. When receiving the e-mail transmitted as the Internet FAX, the relay server 40 determines a FAX device to be the transmission destination of the Internet FAX based on the identification information of the FAX device contained in the E-mail. The relay server 40 transmits the Internet FAX to the FAX device associated with the identification information.

The conversion apparatus 50 is a communication device for converting and transferring Internet FAX and G3 FAX. The conversion apparatus 50 may be, for example, T.38/VoIPGateway. When the conversion apparatus 50 receives an e-mail transmitted as an Internet FAX, it converts an image or document attached to the electronic mail into a G3 FAX format. The conversion apparatus 50 transfers the converted G3 FAX to the third FAX apparatus 30 via the telephone line. In this case, the conversion apparatus 50 transmits the FAX to the third FAX apparatus based on the FAX number contained in the e-mail transmitted as the Internet FAX.

Figure 3:
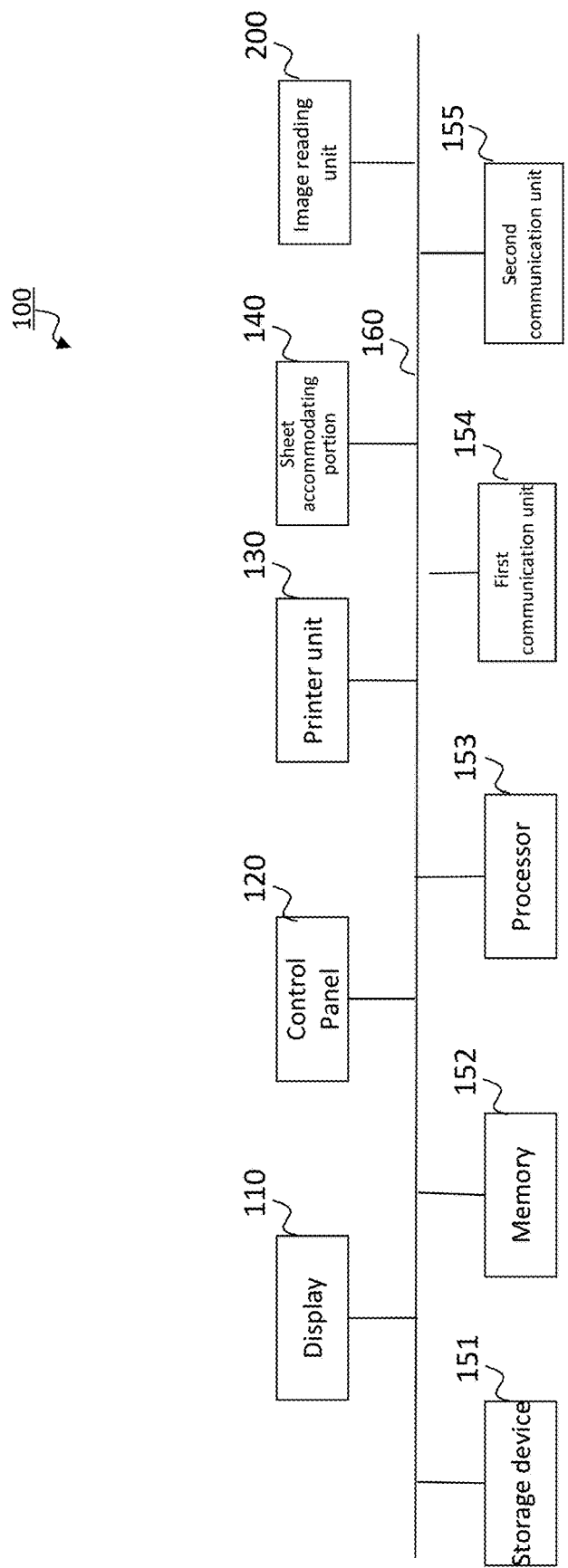
FIG. 3 is a block diagram illustrating a hardware configuration of an image processing apparatus according to an embodiment.

FIG. 3 is a block diagram showing a hardware configuration of the image processing apparatus 100 according to the embodiment. The image processing apparatus 100 is configured to transmit FAX of at least 2 types. The image processing apparatus 100 includes the display 110, the control panel 120, the printer unit 130, the sheet storage unit 140, and the image reading unit 200, and further includes a storage unit 151, a memory 152, a processor 153, a first communication unit 154, and a second communication unit 155. The description of the display 110, the control panel 120, the printer unit 130, the sheet storage unit 140, and the image reading unit 200 are provided above. Hereinafter, the storage device 151, the memory 152, the processor 153, the first communication unit 154, and the second communication unit 155 will be described. The hardware components of the image processing apparatus 100, depicted in FIG. 3, are connected to each other via the system bus 160 so as to be capable of communicating data with each other via the system bus 160.

The storage device 151 is, for example, a hard disk or an SSD (solid state drive), and stores various data. The various data include, for example, a FAX transmission history and an address book. The address book stores information related to each of a plurality of destinations of the FAX. For example, each address book record stores the FAX number and/or the e-mail address. The destination indicates the name of a person who is the transmission destination of the FAX. The FAX number is a number assigned to the FAX device of the transmission destination. The e-mail address is the transmission destination when the FAX is transmitted by using the Internet FAX. When the destination has a plurality of FAX numbers or e-mail addresses, the address book may store a plurality of pieces of information associated with the same destination. For example, when the destination is using the FAX of both the G3 FAX and the Internet FAX, the address book may store the FAX number, as a first information associated with the transmission destination, and the e-mail address, as a second information associated with the transmission destination.

The FAX transmission history indicates a history of FAX transmitted by the image processing apparatus 100. The records of the FAX transmission history include information about the FAX transmission, such as the FAX transmission destination, FAX type and FAX transmission result. The FAX transmission history is updated by the processor 153 to include a new record when the FAX is transmitted. Hereinafter, the FAX transmission history will be described with reference to FIG. 4.

FIG. 4 is a diagram showing a concrete example of the FAX transmission history 80 of the embodiment. The FAX transmission history 80 is stored in the storage device 151. The FAX transmission history 80 includes a destination and a transmission history table 82. The FAX transmission history 80 shown in FIG. 4 represents a FAX transmission history that is generated in response to a search instruction, when "Tokyo Taro" is input as a search term. The search instruction is an instruction to search an address book when the FAX is transmitted. The search instruction includes a search term specified by an arbitrary character string or a numeral or the like relating to the search target. The destination 81 is an area corresponding to the search term specified in the search instruction. According to the destination 81, it can be seen that the search instruction including "Tokyo Taro" as the search information term has been processed.

The transmission history table 82 is a table that is generated by extracting the FAX transmission records corresponding to the destination 81 from the transmission history of the FAX stored in the storage device 151. That is, the transmission history table 82 represents a part of the transmission history of the FAX. The transmission history table 82 has the following fields: No, destination, transmission date, FAX number, mail address, FAX type, transmission time and result. No represents a number for uniquely identifying the FAX transmission record included in the transmission history table 82. In the transmission history table 82, No is displayed up to 1~10. Therefore, it can be seen that the number of records in the transmission history of the FAX stored in the storage device 151, that includes "Tokyo Taro" as the destination, is 10. The destination represents the name of the person to which the FAX is sent. The destination indicated in the FAX transmission history may be a destination stored in the address book when the FAX is transmitted. The transmission date represents the date at which the FAX is transmitted by the image processing apparatus 100. The FAX number represents a FAX number indicating a FAX transmission destination transmitted by the image processing apparatus 100. The FAX number may be recorded with the identification information of the FAX apparatus contained in the e-mail transmitted as the Internet FAX. The FAX number is one example of the transmission destination identification information. The mail address represents an e-mail address indicating the transmission destination of the Internet FAX transmitted by the image processing apparatus 100. The mail address is one example of the transmission destination identification information. The FAX type indicates the type of the FAX standard transmitted by the image processing apparatus 100. For example, when the image processing apparatus 100 transmits the FAX by the G3 FAX, the FAX transmission record indicates "G3" as the FAX type. For example, when the image processing apparatus 100 transmits the FAX by the Internet FAX, the FAX transmission record indicates "T38 SIP" as the FAX type. For example, when the image processing apparatus 100 transmits the FAX by the Internet FAX and the FAX apparatus transmits the FAX by the G3 FAX, the FAX transmission record indicates "T38G/G3" in the FAX type. The FAX type may be determined in accordance with a report of a transmission result sent from the FAX transmission destination. The transmission time represents the time required for the image processing apparatus 100 to transmit the FAX. When the image processing apparatus 100 transmits a plurality of facsimiles (FAXes) at the same time, the FAX transmission record may indicate the total transmission time of FAX as the transmission time, or may indicate the transmission time per 1 sheet. The transmission time may be determined in accordance with a report of a transmission result sent from the transmission destination of the FAX. The result represents whether or not the image processing apparatus 100 has succeeded in transmitting the FAX. When the FAX apparatus receives the FAX transmitted by the image processing apparatus 100, the result field of the FAX transmission record indicates "Success". When the FAX apparatus cannot receive the FAX transmitted by the image processing apparatus 100, the result field of the FAX transmission record indicates "failure". The result may be determined in accordance with a report of the transmission result received by the image processing apparatus 100.

Referring to the example shown in FIG. 4, the record at the uppermost stage of the transmission history table 82 is referred to as the uppermost record.

In the uppermost record, the value of No is "1", the value of the destination is "Tokyo Taro", the value of the transmission date is "2016/8/1", the value of the FAX number is "1234567890", the value of the mail address is blank, the value of the FAX type is "G3", the value of the transmission time is "20 seconds", and the value of the result is "success". Therefore, according to the uppermost record in the uppermost stage of the transmission history table 82, the FAX is transmitted to "Tokyo Taro" on "Aug. 1, 2016", the FAX number to be the destination is "1234567890", the FAX to the FAX number is transmitted by "G3 FAX", and the transmission is successful with the transmission time of "20 sec". The transmission history table shown in FIG. 4 is only one specific example. For this reason, the transmission history table may be configured in a manner different from that in FIG. 4. For example, the transmission history table may also store the number of sheets of FAX transmitted by the image processing apparatus 100.

Referring back to FIG. 3, the description of the image processing apparatus 100 will be continued. The memory 152 temporarily stores data used by each hardware component included in the image processing apparatus 100. The memory 152 is, for example, a random access memory (RAM). The memory 152 may also store digital data generated by the image reading unit 200. The memory 152 may temporarily store one of the FAX transmission job accepted via the control panel 120, the address book, and the search result of the transmission history of the FAX.

The processor 153 controls the operation of each hardware component of the image processing apparatus 100. The processor 153 loads the software program stored in the storage device 151 into the memory 152 and executes the software program. Here, a specific process (e.g., searching an address book) of the processor 153 will be described by way of example. The processor 153 receives a FAX transmission destination search instruction from the user through the control panel 120 from the user. When receiving the search instruction, the processor 153 retrieves a FAX transmission history of the FAX from the storage device 151. Specifically, the processor 153 searches for the FAX transmission records having the search term included in the search instruction. When a plurality of FAX transmission records are retrieved, the processor 153 selects a transmission record with the shortest transmission time for each FAX number included in the retrieved FAX transmission records. The processor 153 then determines the display order the FAX numbers in ascending order of the shortest transmission time thereof. The processor 153 then generates an address book for storing the values of the retrieved FAX numbers in the determined order and displays the same on the display 110. When one FAX transmission history is retrieved, the processor 153 displays an address book for storing the values of the retrieved FAX number on the display 110.

Figure 5:
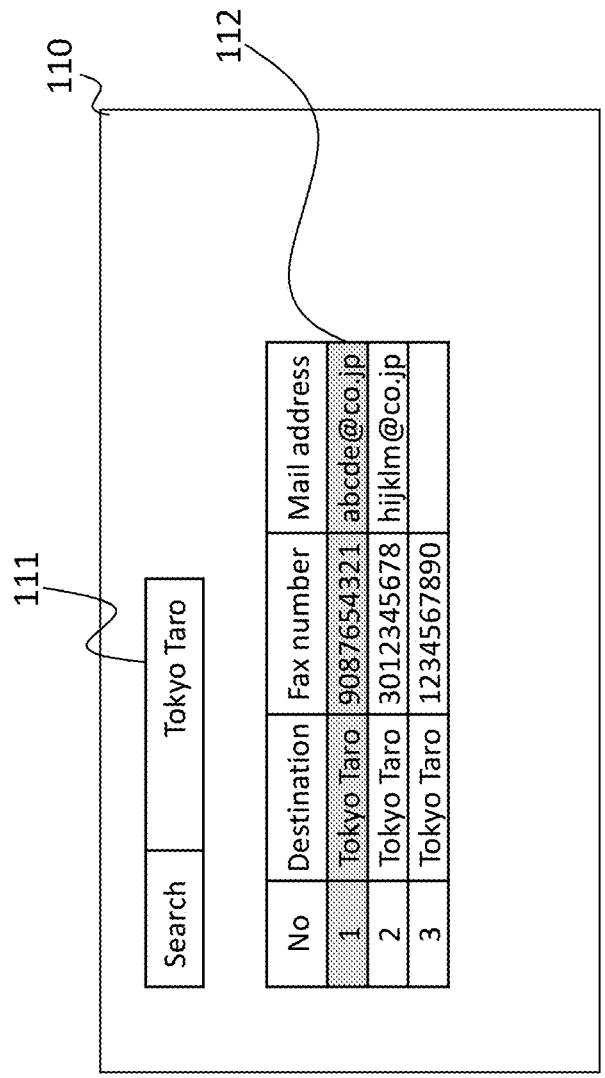
FIG. 5 is a diagram illustrating a specific example of an address book table according to an embodiment.

FIG. 5 is a diagram showing a specific example of the search result of the address book of the embodiment.

The search result of the address book includes a search area 111 and an address book table 112. The search area 111 is an area for receiving the search term included in the search instruction. The user inputs the search term to the search area 111 via the control panel 120. In response to the input of the search term, the processor 153 accepts the search instruction including the search term input to the search area 111.

The address book table 112 is a table indicating a result of searching the FAX transmission history stored in the storage device 151 based on the search term included in the search instruction. The address book table 112 is displayed on the display 110. The search result of the address book is displayed in such a manner that information stored in the address book retrieved as the address book table 112 is arranged from the upper part to the lower part of the display 110. The address book table 112 is generated by arranging the FAX numbers according to the display order determined by the processor 153. The processor 153 generates an address book table based on the search result of the FAX transmission history and the information recorded in the address book. That is, the address book table 112 represents a part of the address book. The records in the address book table 112 are rearranged and displayed based on the respective values of the FAX transmission history. Further, among the records in the address book table 112, the records arranged in the uppermost stage are displayed in a color different from that of the other records of the address book. The address book table 112 has values of No, destination, FAX number, and mail address. No represents a number for uniquely identifying a record represented in the address book table 112. In the address book table 112, No is displayed as 1~3. Therefore, it can be seen that 3 records are in the address book for "Tokyo Taro". The destination represents the name of the person to which the FAX is sent. The destination is the same information as the destination stored in the address book. The FAX number represents the FAX number to be the destination of FAX to be transmitted by the image processing apparatus 100. The FAX number is the same as the FAX number stored in the address book. The FAX number may be stored in the identification information of the FAX apparatus contained in the e-mail transmitted as the Internet FAX. The mail address represents an e-mail address to be the destination of the Internet FAX transmitted by the image processing apparatus 100. The mail address is the same as the mail address stored in the address book.

In the example shown in FIG. 5, the record in the uppermost stage of the address book table 112 has a value of "1", a value of "Tokyo Taro", a value of "9087654321", a value of "abcde@co.jp", and a value of "abcde@co.jp". Therefore, according to the record in the uppermost stage of the address book table 112, it is found that the FAX sent is the FAX transmitted to "Tokyo Taro", and that the FAX number serving as the destination is "9087654321" and the mail address is "abcde@co.jp". Since the record is the uppermost record, the record is displayed in a different color. Therefore, when the user forgets the transmission destination, the user can transmit the FAX while shortening the lost time by selecting the record of the uppermost stage. Note that the address book table shown in FIG. 5 is only a specific example. Therefore, the address book table may be configured in a manner different from that in FIG. 5.

Returning to FIG. 3, the description will be continued. The first communication unit 154 is a network interface circuit. The first communication unit 154 transmits the FAX to the first FAX apparatus 10 via the first network 60. The first communication unit 154 may communicate by a communication method using a telephone line such as a PSTN or an ISDN. The first communication unit 154 may receive the FAX from the first FAX apparatus 10 via the first network 60.

The second communication unit 155 is a network interface circuit. The second communication unit 155 transmits the FAX to the second FAX apparatus 20 or the third FAX apparatus 30 via the second network 70. The second communication unit 155 may communicate by a communication method such as the Internet using a TCP/IP protocol. The second communication unit 155 may receive the FAX from the second FAX apparatus 20 or the third FAX apparatus 30 via the second network 70.

Figure 6:
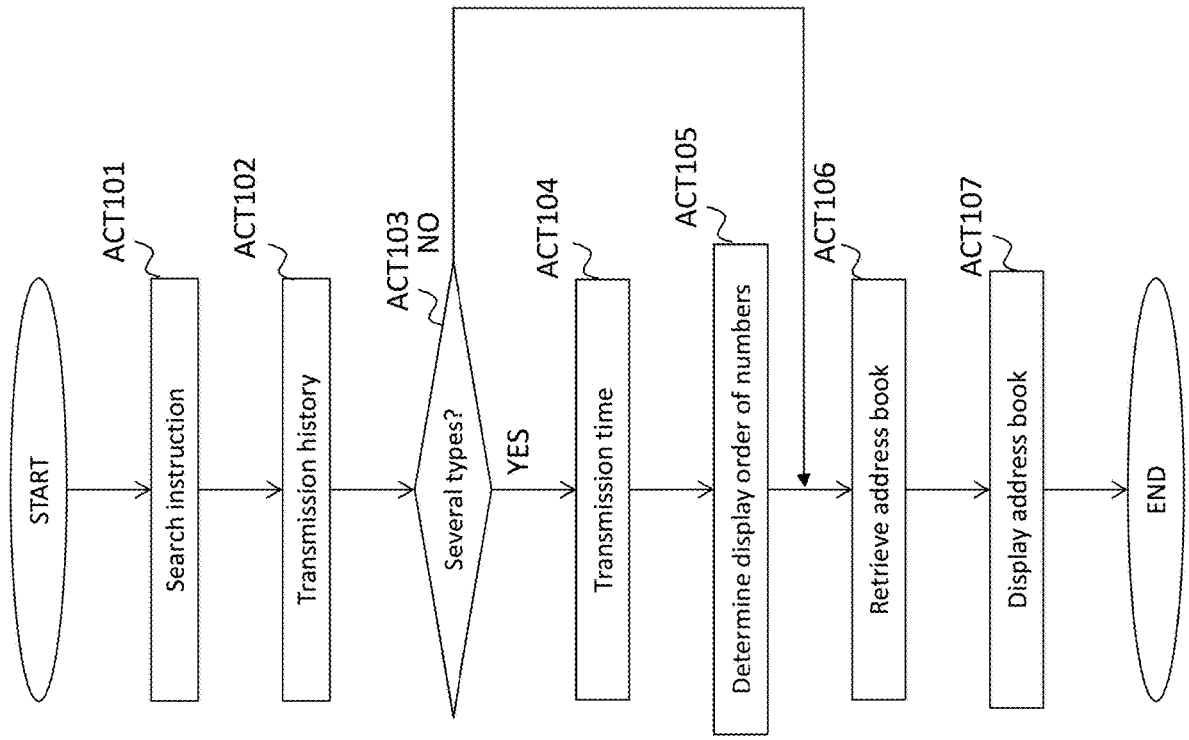
FIG. 6 is a flowchart showing a flow of a process for searching an address book by the image processing apparatus according to the embodiment.

FIG. 6 is a flowchart showing a flow of a process for searching an address book by an image processing apparatus according to an embodiment of the present invention. The processor 153 receives a search instruction for the FAX transmission destination from the user through the control panel 120 from the user (ACT 101). Specifically, the processor 153 receives the search instruction with the search term input to the search area 111 displayed on the display 110. The search instruction includes the search term input to the search area 111.

The processor 153 searches for a transmission history stored in the storage device 151 (ACT 102). Specifically, the processor 153 retrieves FAX transmission history records having the value of the search term included in the search instruction. The processor 153 determines whether or not there are a plurality of FAX numbers based on the retrieved FAX transmission history records (ACT 103). Specifically, the processor 153 determines whether or not there are a plurality of types of FAX numbers in the retrieved FAX transmission history records. For example, when the different FAX numbers are in the retrieved FAX transmission history records, the processor 153 determines that there are a plurality of types of FAX numbers. On the other hand, when the same FAX number is stored in each record, the processor 153 determines that there are no plurality of types of FAX numbers.

When it is determined that there is not a plurality of FAX numbers (ACT 103: NO), the processor 153 transitions to ACT 106. When it is determined that there are a plurality of FAX numbers (ACT 103: YES), the processor 153 acquires the transmission times stored in the retrieved FAX transmission history records (ACT 104). The processor 153 determines the order in which the FAX numbers are to be arranged and displayed in the order of shortest transmission time (ACT 105). Specifically, the processor 153 specifies the FAX transmission history record with the shortest transmission time for each FAX number. The processor 153 determines the display order in which the FAX numbers in the retrieved FAX transmission history records are displayed in order of shortest transmission time.

The processor 153 acquires, from the storage device 151, information of the address book that holds the value of the FAX number whose display order has been determined (ACT 106). The processor 153 generates the address book table 112 based on the acquired information of the address book. The address book table 112 is generated by arranging the FAX numbers in the determined order. The processor 153 displays the address book table 112 on the display 110 (ACT 107). The processor 153 changes the color of the record at the uppermost stage of the address book table 112.

In the image processing apparatus 100 configured as described above, the control unit searches the FAX transmission history based on the search term included in a search instruction, and determines the order in which the transmission destination identification information indicating the FAX transmission destinations in the retrieved FAX transmission history records is displayed based on the predetermined conditions relating to the FAX transmission. The display unit displays a plurality of pieces of transmission destination identification information in the determined order. As a result, the user can determine the FAX transmission destination more easily even when a plurality of FAX numbers are displayed as a search result by checking the FAX numbers that are displayed in accordance with a predetermined condition related to the FAX transmission.

Modification Example

In the embodiments described above, the processor 153 is configured to arrange the address book table 112 to be displayed from the top to the bottom of the display 110, but is not limited thereto. For example, the processor 153 may be configured to arrange an address book table to be displayed from a left portion to a right portion of the display 110.

Figure 7:
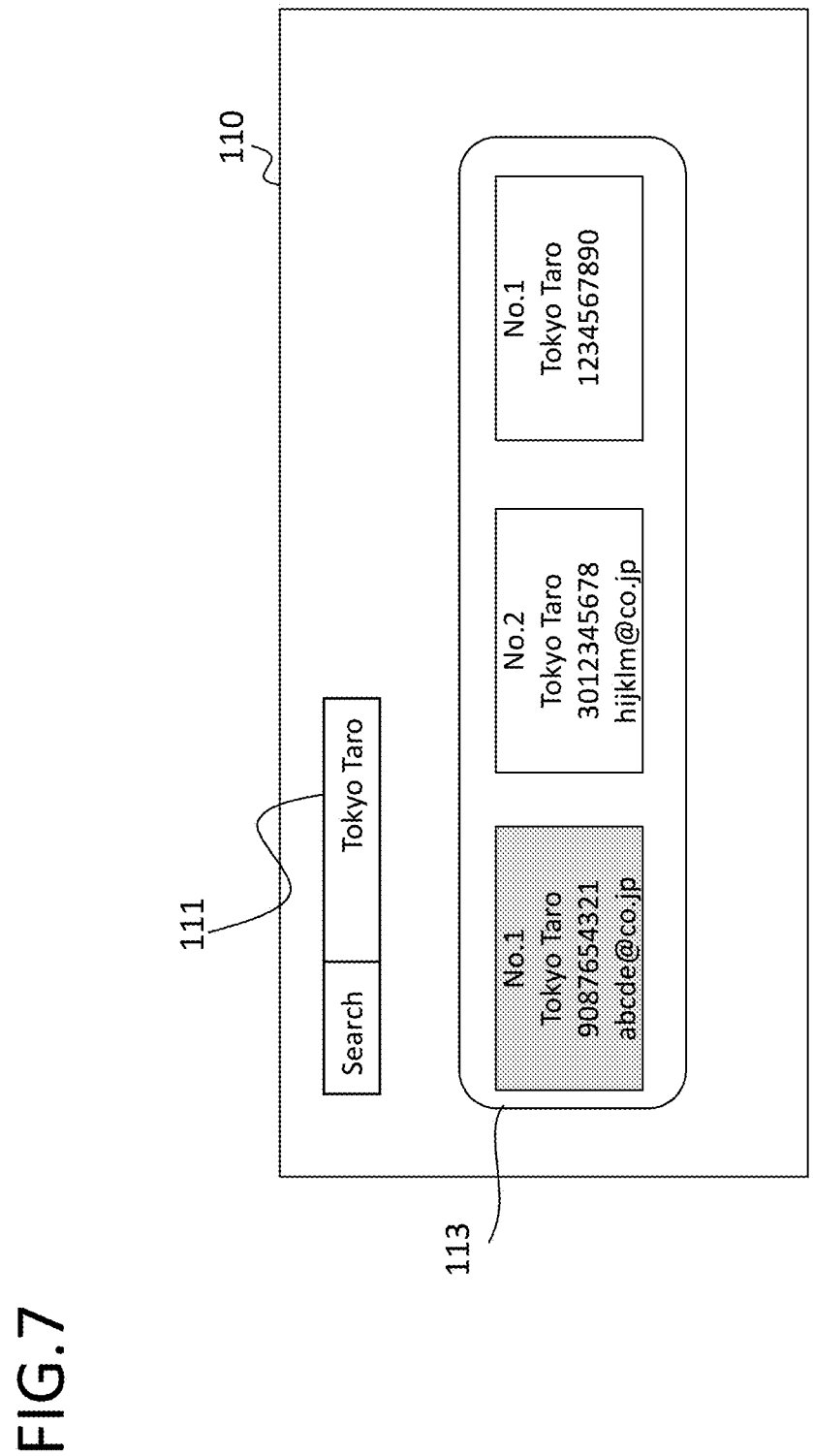
FIG. 7 is a diagram illustrating a specific example of a modification example of the search result of the address book of the embodiment.

FIG. 7 is a diagram showing a specific example of a modification example of the search result of the address book of the embodiment. The search result of the address book includes a search area 111 and an address book area 113. Among these, the search area 111 is the same as that in FIG. 5, and therefore description thereof will not be repeated. The address book area 113 is an area representing the result of searching the FAX transmission history stored in the storage device 151 based on the search term included in the search instruction. The address book area 113 is displayed on the display 110. The search result of the address book is displayed by arranging information stored in the address book retrieved as the address book area 113 from the left part to the right part of the display 110. The processor 153 generates the address book area 113 based on the search result of the FAX transmission history and the information recorded in the address book. That is, the address book area 113 represents a part of the address book. Further, each record in the address book area 113 is displayed on the basis of each value in the FAX transmission history. Further, among the records in the address book area 113, the records arranged in the uppermost left corner are displayed in a color different from that of the other address book. The address book area 113 has respective values of No, destination address, FAX number, and mail address. Since these values are the same as those of the address book table 112, the description thereof will not be repeated. With this configuration, when the user forgets to select a transmission destination, the user can transmit the FAX while shortening the lost time by selecting the record of the uppermost stage.

In the embodiment described above, the processor 153 determines the order in which the FAX numbers are arranged and displayed in ascending order of transmission time in the FAX transmission history records retrieved based on the search term, but is not limited to the transmission time. For example, the processor 153 may determine the order in which the FAX numbers are displayed, based on other conditions relating to the FAX transmission. Specific examples of the conditions will be described below.

The processor 153 may determine the order in which FAX numbers are arranged and displayed in descending order of FAX transmission speed in the FAX transmission history records that are retrieved based on the search term. Specifically, the processor 153 calculates the transmission speed by dividing the transmission time in the retrieved FAX transmission history records by the number of transmitted sheets. Next, the processor 153 identifies the transmission history record with the earliest transmission speed for each FAX number. The processor 153 determines the order in which the FAX numbers of the retrieved FAX transmission history records are displayed in descending order of the transmission speed.

The processor 153 may determine the order in which FAX numbers are arranged and displayed in accordance with the FAX type in the FAX transmission history records that are retrieved based on the search term. Specifically, the processor 153 acquires the FAX type of the retrieved FAX transmission history records. Next, the processor 153 determines the order in which the FAX numbers are displayed, depending on the acquired FAX type. In this case, the order of FAX numbers is determined in advance according to the FAX type. For example, when 3 types of FAX types, G3, T38, G3, and T38 SIP are in the retrieved FAX transmission history records, the processor 153 determines the order in which the FAX numbers are displayed in the order of T38 SIP, T38/G3, and G3.

The processor 153 may determine the order in which the FAX numbers are arranged and displayed based on the transmission dates in the FAX transmission history records retrieved based on the search term. Specifically, the processor 153 acquires the transmission date in the specified FAX transmission history records. Next, the processor 153 determines the order in which the FAX numbers are displayed in the order of the most recent transmission dates.

The processor 153 may determine the order in which the FAX numbers are arranged and displayed based on the result indication in the FAX transmission history records retrieved based on the search term. Specifically, the processor 153 acquires the result in the retrieved FAX transmission history records. Next, the processor 153 calculates the reliability for each FAX number in the FAX transmission history. The reliability is an indicator indicating whether or not the FAX transmitted by the image processing apparatus 100 is successfully transmitted. The processor 153 calculates the reliability for each FAX number by dividing the number of FAX transmission history records in which "success" is indicated by the number of FAX transmission history records. The processor 153 determines the order in which the FAX numbers are displayed in order of high reliability to low reliability.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image processing apparatus comprising:
 a storage device in which a FAX transmission history including a plurality of FAX transmission records, is stored;
 a processor configured to search the FAX transmission history in response to a search instruction to retrieve FAX transmission records according to a search term specified in the search instruction, and determine a display order of FAX transmission destinations specified in the retrieved FAX transmission records based on a predetermined FAX transmission condition for each of the retrieved FAX transmission records, wherein the predetermined FAX transmission condition is a FAX transmission speed, and a FAX transmission destination of the FAX transmission record having the fastest FAX transmission speed has the highest display order; and
 a display device configured to display the FAX transmission destinations according to the display order determined by the processor.

2. The image processing apparatus according to claim 1, wherein each FAX transmission destination includes a person's name and at least one of a FAX number and an e-mail address.

3. The image processing apparatus according to claim 1, wherein the FAX transmission destination having the highest display order is displayed on the display device in a color different from the other FAX transmission destinations.

4. An image processing apparatus comprising:
a storage device in which a FAX transmission history including a plurality of FAX transmission records, is stored;
a processor configured to search the FAX transmission history in response to a search instruction to retrieve FAX transmission records according to a search term specified in the search instruction, and determine a display order of FAX transmission destinations specified in the retrieved FAX transmission records based on a predetermined FAX transmission condition for each of the retrieved FAX transmission records, wherein the predetermined FAX transmission condition is a FAX transmission method and a FAX transmission destination of the FAX transmission record having a predetermined FAX transmission method has the highest display order; and
a display device configured to display the FAX transmission destinations according to the display order determined by the processor.

5. The image processing apparatus according to claim 4, wherein the FAX transmission method complies with one of a plurality of FAX transmission standards.

6. The image processing apparatus according to claim 4, wherein each FAX transmission destination includes a person's name and at least one of a FAX number and an e-mail address.

7. The image processing apparatus according to claim 4, wherein FAX transmission destination having the highest display order is displayed on the display device in a color different from the other FAX transmission destinations.

8. An image processing apparatus comprising:
a storage device in which a FAX transmission history including a plurality of FAX transmission records, is stored;
a processor configured to search the FAX transmission history in response to a search instruction to retrieve FAX transmission records according to a search term specified in the search instruction, and determine a display order of FAX transmission destinations specified in the retrieved FAX transmission records based on a predetermined FAX transmission condition for each of the retrieved FAX transmission records, wherein the predetermined FAX transmission condition is a transmission date and a FAX transmission destination of the FAX transmission record having the most recent transmission date has the highest display order; and
a display device configured to display the FAX transmission destinations according to the display order determined by the processor.

9. The image processing apparatus according to claim 8, wherein each FAX transmission destination includes a person's name and at least one of a FAX number and an e-mail address.

10. The image processing apparatus according to claim 8, wherein the FAX transmission destination having the highest display order is displayed on the display device in a color different from the other FAX transmission destinations.

11. A method of displaying FAX transmission destinations in an image processing apparatus having a storage device in which a FAX transmission history including a plurality of FAX transmission records, is stored and a display device, said method comprising:
searching the FAX transmission history in response to a search instruction to retrieve FAX transmission records according to a search term specified in the search instruction;
determining a display order of FAX transmission destinations specified in the retrieved FAX transmission records based on a predetermined FAX transmission condition for each of the retrieved FAX transmission records, wherein the predetermined FAX transmission condition is a FAX transmission speed, and a FAX transmission destination of the FAX transmission record having the fastest FAX transmission speed has the highest display order; and
displaying on the display device, the FAX transmission destinations according to the determined display order.

12. The method of claim 11, wherein each FAX transmission destination includes a person's name and at least one of a FAX number and an e-mail address.

13. The method of claim 11, wherein the FAX transmission destination having the highest display order is displayed on the display device in a color different from the other FAX transmission destinations.

14. A method of displaying FAX transmission destinations in an image processing apparatus having a storage device in which a FAX transmission history including a plurality of FAX transmission records, is stored and a display device, said method comprising:
searching the FAX transmission history in response to a search instruction to retrieve FAX transmission records according to a search term specified in the search instruction;
determining a display order of FAX transmission destinations specified in the retrieved FAX transmission records based on a predetermined FAX transmission condition for each of the retrieved FAX transmission records, wherein the predetermined FAX transmission condition is a FAX transmission method and a FAX transmission destination of the FAX transmission record having a predetermined FAX transmission method has the highest display order; and
displaying on the display device, the FAX transmission destinations according to the determined display order.

15. The method of claim 14, wherein the FAX transmission method complies with one of a plurality of FAX transmission standards.

16. The method of claim 14, wherein each FAX transmission destination includes a person's name and at least one of a FAX number and an e-mail address.

17. The method of claim 14, wherein FAX transmission destination having the highest display order is displayed on the display device in a color different from the other FAX transmission destinations.

18. A method of displaying FAX transmission destinations in an image processing apparatus having a storage device in which a FAX transmission history including a plurality of FAX transmission records, is stored and a display device, said method comprising:
searching the FAX transmission history in response to a search instruction to retrieve FAX transmission records according to a search term specified in the search instruction;
determining a display order of FAX transmission destinations specified in the retrieved FAX transmission records based on a predetermined FAX transmission condition for each of the retrieved FAX transmission records, wherein the predetermined FAX transmission condition is a transmission date and a FAX transmission destination of the FAX transmission record having the most recent transmission date has the highest display order; and displaying on the display device, the FAX transmission destinations according to the determined display order.

19. The method of claim 18, wherein each FAX transmission destination includes a person's name and at least one of a FAX number and an e-mail address.

20. The method of claim 18, wherein the FAX transmission destination having the highest display order is displayed on the display device in a color different from the other FAX transmission destinations.

* * * * *

UNITED STATES PATENT AND TRADEMARK OFFICE
CERTIFICATE OF CORRECTION

PATENT NO. : 11,044,379 B2
APPLICATION NO. : 16/585546
DATED : June 22, 2021
INVENTOR(S) : Hideki Endo It is certified that error appears in the above-identified patent and that said Letters Patent is hereby corrected as shown below:

In the Claims

Column 11
Claim 7, Line 29, insert -- the -- before "FAX".

Column 12
Claim 17, Line 46, insert -- the -- before "FAX".

Signed and Sealed this
Twenty-fourth Day of May, 2022

*Katherine Kelly Vidal*

Katherine Kelly Vidal
*Director of the United States Patent and Trademark Office*